(No Model.)  6 Sheets—Sheet 1.

N. E. BROWN & W. R. WILLCOX.
MACHINE FOR MAKING WOODEN TRAYS.

No. 304,166.  Patented Aug. 26, 1884.

Witnesses:
Philip Mari
Emory H. Bates,

Inventors
N. E. Brown
W. R. Wilcox
by Audron & Smith
their Attorneys.

(No Model.)  6 Sheets—Sheet 2.
N. E. BROWN & W. R. WILLCOX
MACHINE FOR MAKING WOODEN TRAYS.
No. 304,166. Patented Aug. 26, 1884.
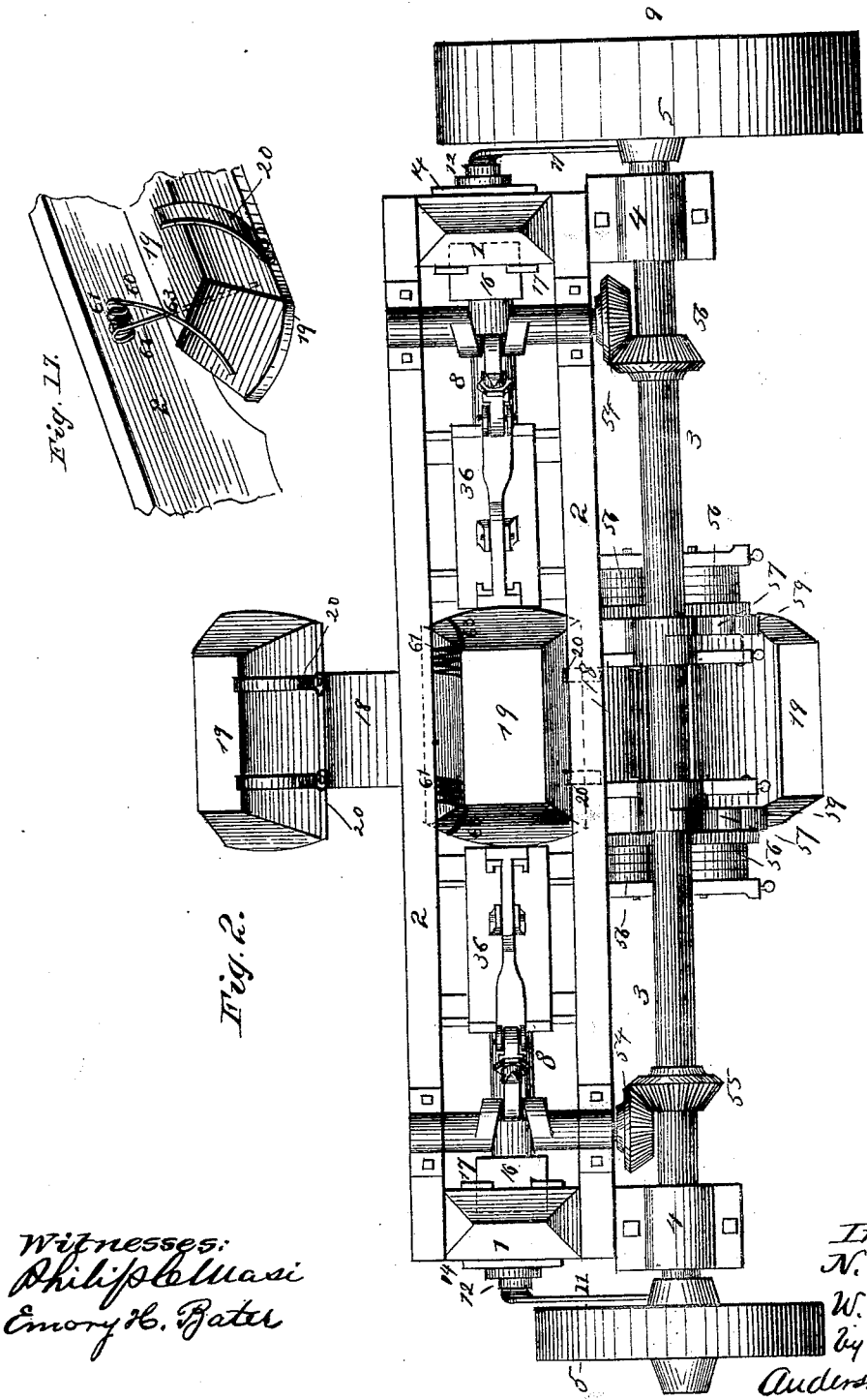
Witnesses:
Philip C. Masi
Emory H. Bates
Inventors
N. E. Brown
W. R. Willcox
by
Anderson & Smith
their Attorneys.

(No Model.)
N. E. BROWN & W. R. WILLCOX.
MACHINE FOR MAKING WOODEN TRAYS.
No. 304,166. Patented Aug. 26, 1884.
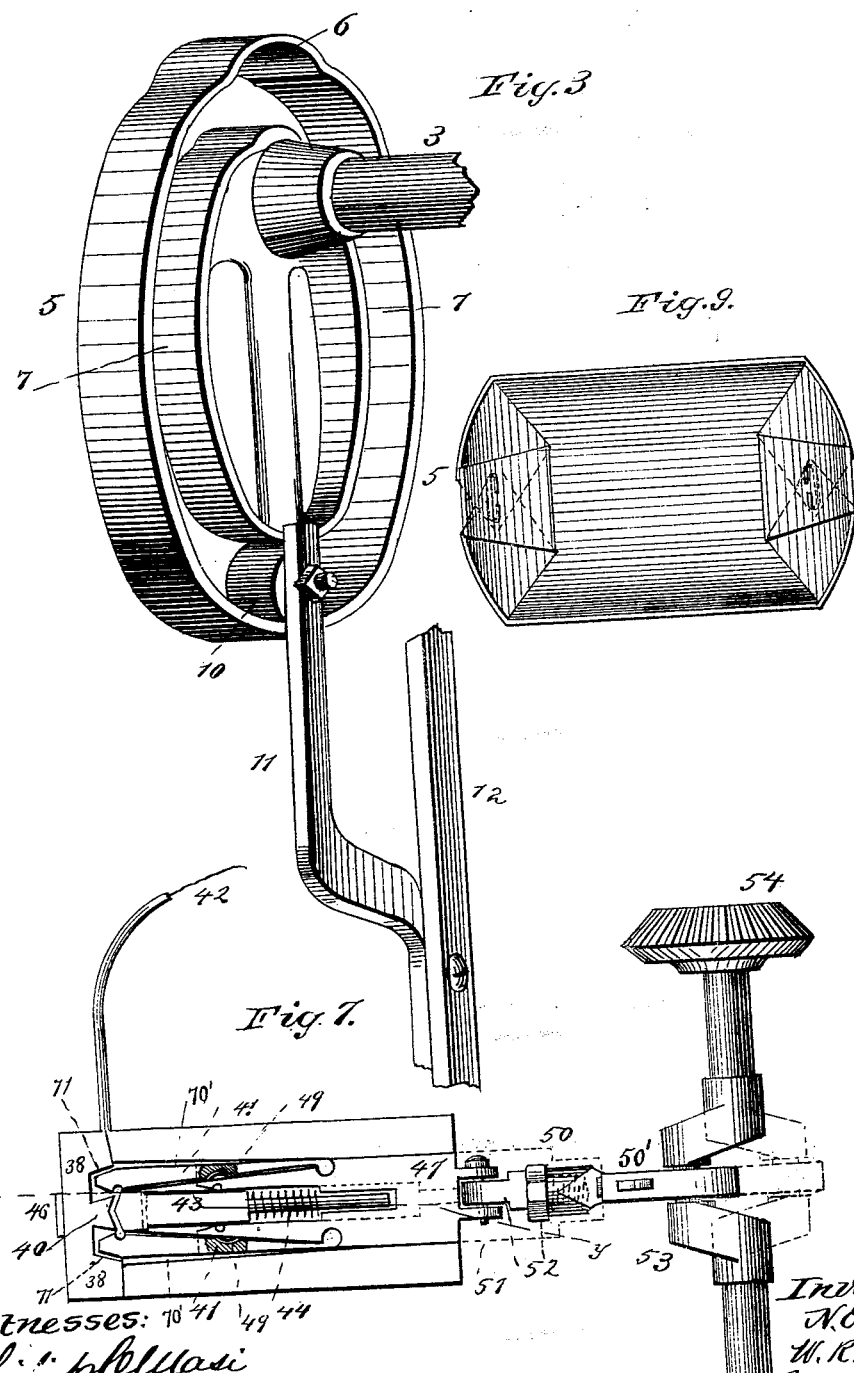

(No Model.) 6 Sheets—Sheet 4.
N. E. BROWN & W. R. WILLCOX.
MACHINE FOR MAKING WOODEN TRAYS.
No. 304,166. Patented Aug. 26, 1884.
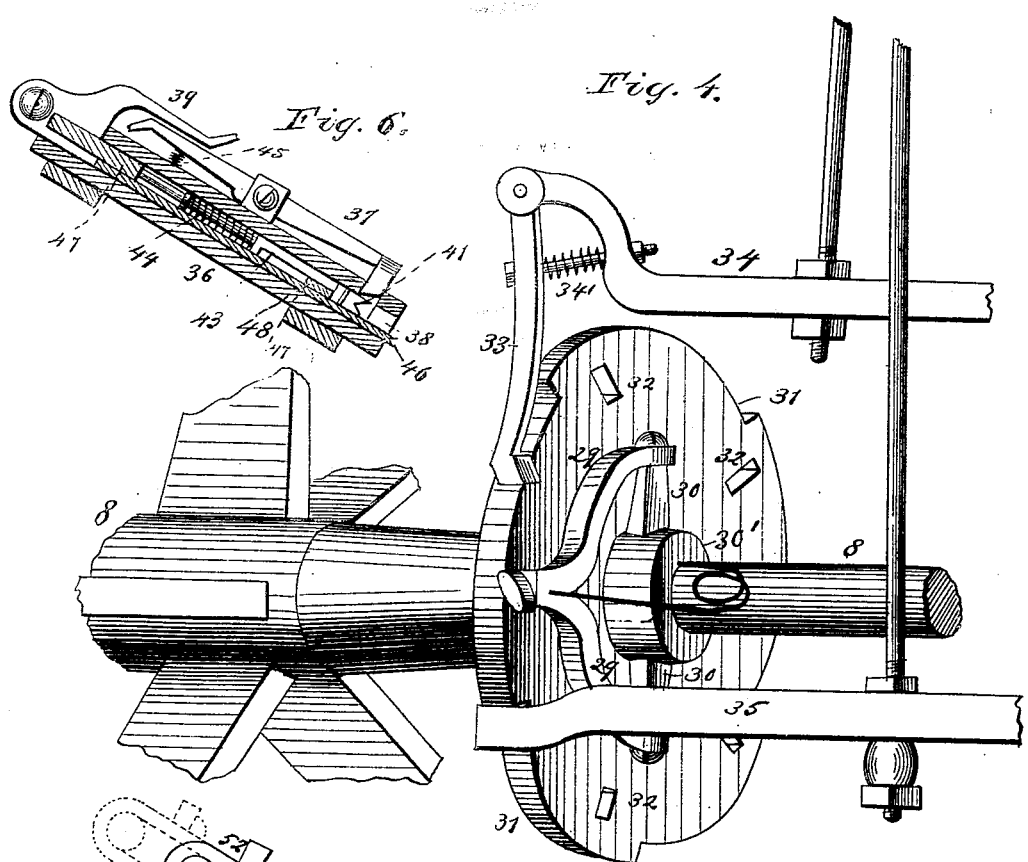
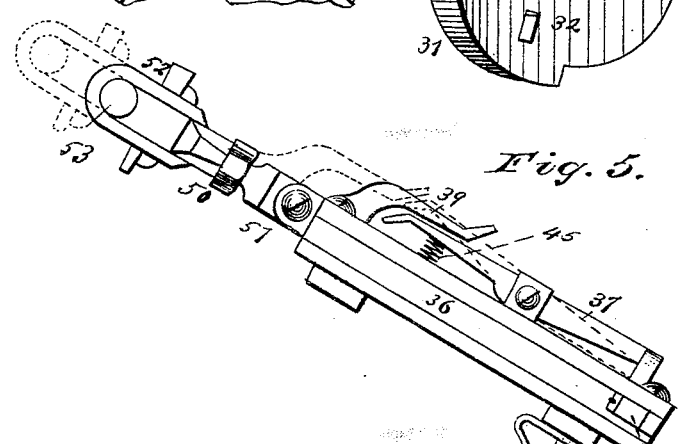
Witnesses:
Philip C. Masi.
Emory H. Bates
Inventors
N. E. Brown
W. R. Wilcox,
by Anderson & Smith
their Attorneys.

(No Model.)  6 Sheets—Sheet 5.
N. E. BROWN & W. R. WILLCOX.
MACHINE FOR MAKING WOODEN TRAYS.
No. 304,166.  Patented Aug. 26, 1884.
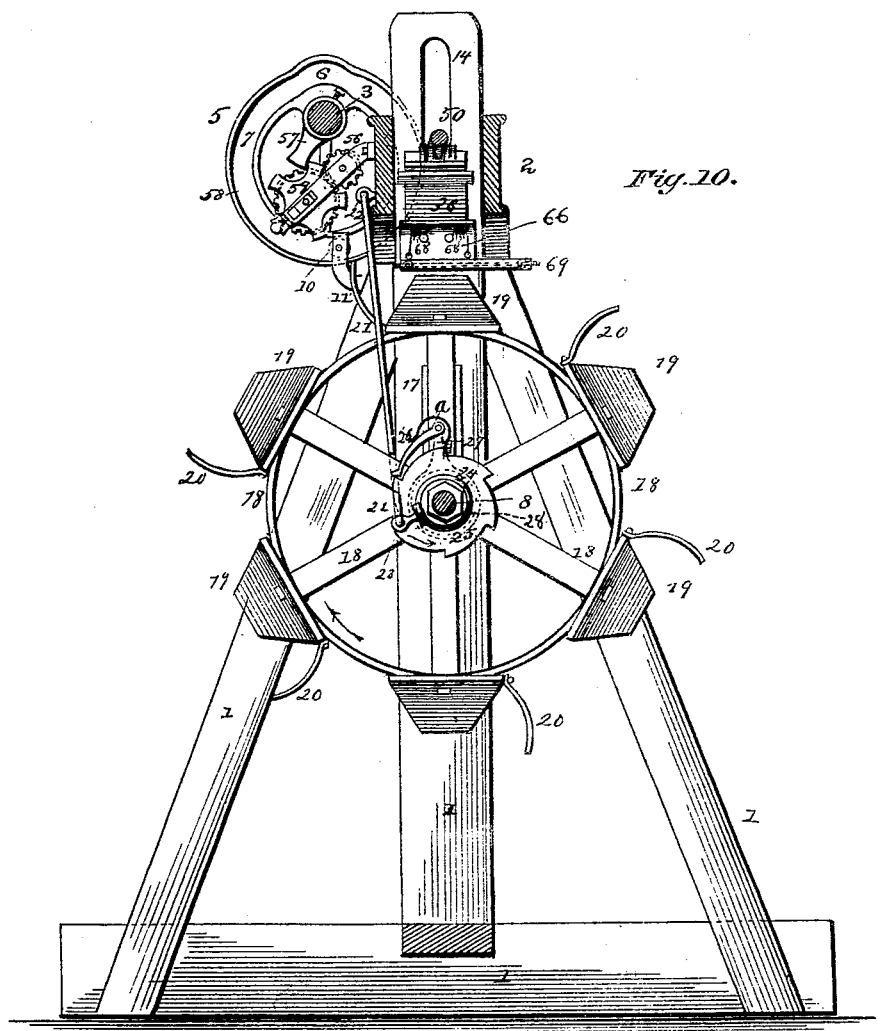
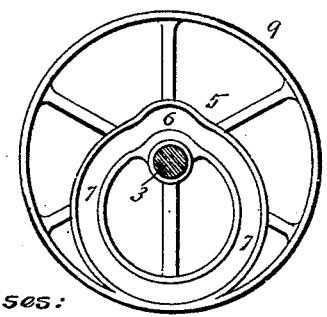
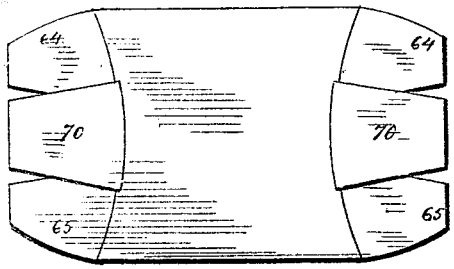
Witnesses:
Philip C. Masi.
Emory H. Bates.
Inventors:
N. E. Brown
W. R. Willcox
by Anderson Smith
their Attorneys.

(No Model.) 6 Sheets—Sheet 6.
N. E. BROWN & W. R. WILLCOX.
MACHINE FOR MAKING WOODEN TRAYS.
No. 304,166. Patented Aug. 26, 1884.
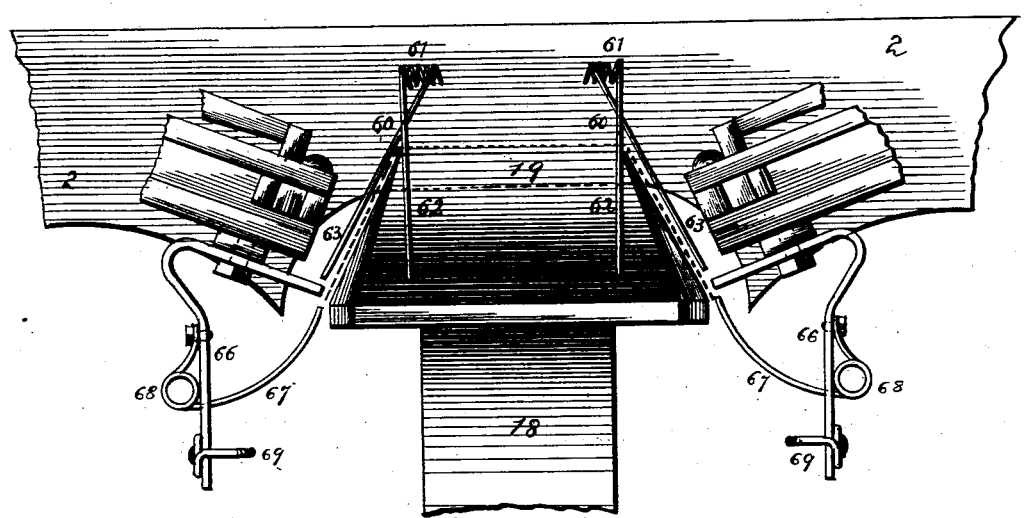
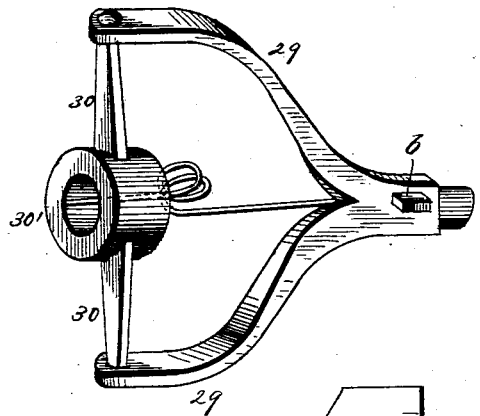
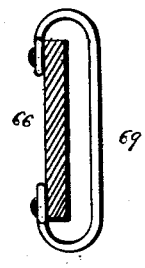
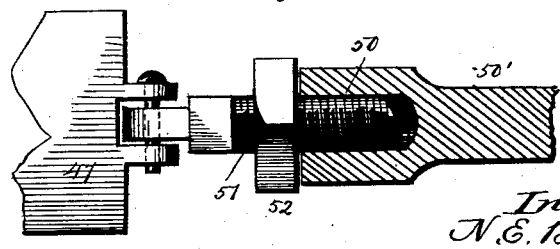
Witnesses:
Theo. Mungen.
John T. Morrow.
Inventors
N. E. Brown
W. R. Willcox
By Anderson & Smith
their Attorneys.

UNITED STATES PATENT OFFICE.

NORMAN E. BROWN AND WILLIAM R. WILLCOX, OF ST. JOSEPH, MICH.

MACHINE FOR MAKING WOODEN TRAYS.

SPECIFICATION forming part of Letters Patent No. 304,166, dated August 26, 1884.

Application filed October 9, 1882. (No model.)

*To all whom it may concern:*

Be it known that we, NORMAN E. BROWN and WILLIAM R. WILLCOX, citizens of the United States, residents of St. Joseph, in the county of Berrien and State of Michigan, have invented a new and valuable Improvement in Machines for Making Wooden Trays; and we do hereby declare that the following is a full, clear, and exact description of the construction and operation of the same, reference being had to the annexed drawings, making a part of this specification, and to the letters and figures of reference marked thereon.

Figure 1:
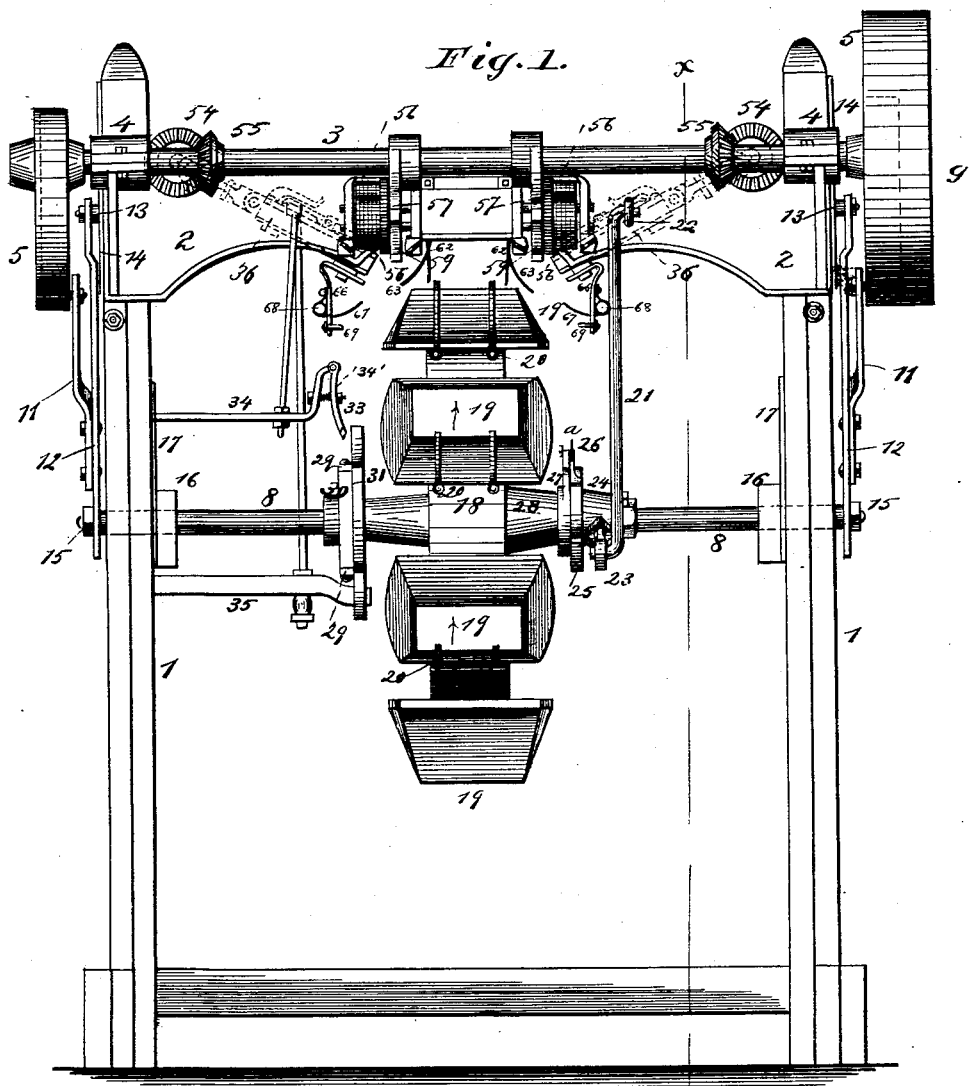
Figure 8:
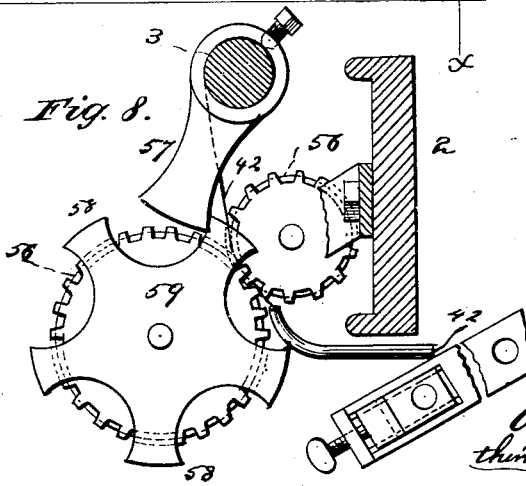

Figure 1 is a rear elevation of a machine embodying the improvements of our invention. Fig. 2 is a plan view of the same. Fig. 3 is a perspective detail view of the eccentrics having the concentric depression, the shaft 3, bars 11 and 12, and roller 10. Fig. 4 is a perspective detail view of the ratchet 31, spring-lever, slip-latch, bars 34 and 35, and shaft 8. Fig. 5 is a side elevation of one-half of the staple forming and driving mechanism, showing the lever 37, slide 39, connecting-rod, and blank-guide. Fig. 6 is a longitudinal sectional view of the same on the line *y y* in Fig. 7. Fig. 7 is a detail view of the staple-forming and staple-driving mechanism. Fig. 8 is a detail view of the mechanism for feeding the wire to the forming and driving mechanism. Fig. 9 is a plan of the completed tray. Fig. 10 is a sectional view of the machine on line *x x* in Fig. 1. Fig. 11 is a face view of the cam 5 and pulley 9, and Fig. 12 is a plan of the blank from which the tray is formed. Fig. 13 is a sectional detail view showing the former and blank in position between the staple forming and driving mechanisms, ready for the staples to be driven. Fig. 14 is a detail perspective view of the spring-catch lever 29. Fig. 15 is a sectional detail view of the crank-arm, eyebolt connected to plate 47, and the jam-nut. Fig. 16 is a section of the hanger 66, and having the guide-wire for receiving the end of the blank; and Fig. 17 is a sectional perspective view of the shaping spring-arms, the stop, and the former.

This invention has relation to machines for making wooden trays; and it consists in the construction and novel arrangement of parts, as will be hereinafter fully described, and particularly pointed out in the claims appended.

In the drawings, 1 indicates the standards of the machine, which support two parallel horizonal metal plates, 2, the said plates constituting a portion of the frame of the machine.

3 indicates the main driving-shaft, which is mounted in bearings 4, and which constitutes the main driving-power for all operative parts of the machine.

5 indicates two grooved wheels eccentrically mounted upon the ends of the driving-shaft 3, each of said wheels or eccentrics having a concentric depression, 6, in its groove 7, the object of which will be hereinafter explained. These eccentrics are employed to raise and lower a shaft, 8, which carries the former-wheel, the object being to raise the former-wheel, so as to bring the trays successively into position for the staple-driving mechanisms to drive the staples into the trays, and to then lower the former-wheel and automatically impart a partial rotation thereto, so as to throw off the finished tray and bring a second former uppermost in position for the operator to place a blank in position to be formed into a tray. A pulley, 9, is fixed over one of the eccentrics 5, and a driving-belt applied to said pulley, so as to impel the same, and consequently rotate shaft 3. The rollers 10, which travel in the grooves of the eccentrics, are carried at the upper ends of the bars 11, one of which is located at each end of the machine, and as the mechanisms at such ends are similar to each other a description of one will answer for both. The bar 11 is connected with a vertical reciprocating bar, 12, carrying at its upper end a roller, 13, which works in any suitable groove or way in or on a plate, 14, fixed to the standard 1. At its lower end the reciprocating bar 12 is firmly held on the end of the non-rotating shaft 8 by means of a tightening-nut, 15. The shaft 8 passes through slide-blocks 16, which work in ways formed in plates 17, secured to the vertical standards of the main frame, whereby shaft 8 will be guided in its up and down movements. The former-wheel 18, mounted so as to be capable of turning on shaft 8, is provided with a series of formers, 19, of the shape shown in the drawings.

20 designates stops, against which the front edge of the blank rests when in position over the former, the stops rising from the former-wheel curved slightly, as shown, and extending slightly above the tops of the former, so that the front edge of the blank, when that side is pressed down, will follow the curve of the stops to the rear incline of the former.

Secured to the inner faces of the metal plates 2 are four pairs of spring-arms, 60, having central homogeneous coils, 61. The arms 62 of each pair 60 incline downwardly and outwardly along the sides of the blank, thereby pushing it in against the sides of the former, while the arm 63 of the pairs incline downwardly and outwardly along the ends of the blank, when on the former against the outer end sections, 64 and 65, of the blank.

To the under side of the staple forming and driving mechanisms are secured depending lateral hangers 66, the width of which at their curved upper ends is equal to the width of the space between the metal plates 2, while the straight portion below the plates 2 is wider and extends at the front side of the machine out beneath them, as seen in Fig. 10. These hangers 66 are each provided with two spring-arms, 67, secured thereto by bolts. These spring-arms 67 have coils 68, and their ends are passed through holes in the hangers 66, and have their free ends curved inwardly and upwardly, their extreme points terminating quite near the base of the former when in its highest position and between the staple forming and driving mechanism. Near their lower ends the hangers 66 are provided with transverse horizontal bent-wire guides 69, to which the blanks are fed by the operator before the former has reached a point on a line therewith in its ascent. The operator grasps the middle sections of the blank at each end, and, bending them slightly down, slips the blank upon the guide-wires 69, the middle sections, 70, being beneath the guides and the outer sections, 64 and 65, being above the guides. As the blank is pressed upon from beneath by the former, it will be gradually raised up, and will come in contact with the spring-arms 67, which will cause the corner-sections 64 and 65 to be turned down and inward, lapping over the middle section, which has been bent below them, and held down for a time by the guides 69. The former continues to ascend until the blank has assumed the shape of the former, and remains stationary between the staple mechanisms, at which time the staples are formed and driven through the laps of the end sections of the tray, after which the wheel descends and revolves to throw off the formed tray and bring up the next former. By such arrangement of devices it will be seen that as the eccentrics 5 are caused to revolve the rollers 10, traveling in their grooves, will cause shaft 8, through the medium of the connections already described, to be alternately raised and lowered.

21 indicates a connecting-rod, which at its upper end engages in a staple, 22, fixed upon one of plates 2, and at its lower end engages in an eye of a lever, 23, of a hub or collar, 24, loosely arranged upon shaft 8. This hub or collar 24 carries a ratchet-wheel, 25, the teeth of which are equal in number to the number of formers 19. As the shaft 8 is raised, the hub and its ratchet will necessarily be turned in one direction by reason of connecting-rod 21, the movement being just sufficient to allow a spring-pawl, 26, $a$ designating the spring, to drop back one tooth of the ratchet 25. This pawl is carried by an arm, 27, projecting from the hub 28 of the former-wheel, and hence as the shaft 8 descends a positive partial rotation will be given to the former-wheel by reason of the engagement of the ratchet-wheel and pawl, the ratchet-wheel being of course turned back by means of the connecting-rod 21.

The devices for locking and unlocking the former-wheel are as follows: A spring catch-lever, 29, is provided with two arms respectively fixed upon the arms 30, projecting from a collar, 30', rigid upon shaft 8. Alongside of this spring catch-lever is a ratchet, 31, provided upon its periphery with teeth equal in number to the number of formers, and having in its side a number of recesses, 32, also equal in number to the said number of formers, the recesses being located so as to receive a pin, $b$, Fig. 14, upon catch-lever 29. This ratchet is fixed upon the hub of the former-wheel, so that when the lever 29 is engaged in one of said recesses the former-wheel will be locked upon the shaft 8.

33 indicates a slip-latch pivoted at its upper end to a rod, 34, which is attached to the main frame. Now, as the shaft 8 commences to lower, after the staples have been driven into the tray by the staple mechanism hereinafter to be described, it becomes necessary to release catch-lever 29 from ratchet 31, so as to allow the former-wheel to be turned, in order to allow the finished tray to drop off and bring up the next former. To effect this the slip-latch 33 is provided. This latch, thrown forward by a spring, 34', comes under the end of catch-lever 29 and throws its end out of connection with ratchet 31', thus leaving the ratchet 31 and the former-wheel free to be revolved by the ratchet 25, with which spring-pawl 26 is in engagement, it being remembered that said pawl is on an arm carried by the hub of the former-wheel. At the moment shaft 8 reaches its lowest or nearly its lowest limit, 1, the spring-bar 35, attached to the main frame, engages one of the teeth of ratchet 31 and checks its revolution. At this juncture one of the formers is uppermost in position for the workman to put a fresh blank in place. As shaft 8, with the former-wheel, ascends to carry up the blank to the staple mechanism, the slip-latch 33 passes over catch-lever 29, and after passing spring 34' throws the slip-latch against the face or side of ratchet 31, ready to again pass under the catch-lever when the former descends.

In order to hold the former-wheel stationary while the staples are being driven, the eccentrics have each a concentric depression, 6, in their respective grooves. At the proper moment the rollers drop in these concentric depressions, and while passing in and out of the same and through that portion of the grooves nearest to the main shaft the bars 11 will not descend.

The mechanism for forming and driving the staples into the trays is as follows:

The machine is provided with two mechanisms for forming and driving staples, these being respectively located in and on the inclined casings 36, as indicated, a description of one serving for both.

37 indicates a lever pivoted on top of casing 36 at or about the middle of the casing. The lower end of lever 37 has two lateral projections, one of which only is shown, these projections being adapted to extend down through an opening in the casing and enter a block, 38, at points on opposite sides of that portion 40 of said block on which the wire is bent to form the staple, and which can be designated as block 40.

39 is a slide, which, when passed over the upper end of lever 37, depresses the upper and raises the lower end from block 38, so as to allow the plungers 41 to descend. As these plungers descend, they sever the wire 42, leaving a length within the casing suitable for forming the staple. As the plungers further descend, they bend said length of wire upon the sides of block 40, so as to form the staple.

43 is a slide between the plungers. This slide, when brought down, strikes the wire upon the face of block 40 and forms the middle of the staple. The slide 43 has a stem with a coiled spring, 44, around the same, said spring tending to hold the slide against the staple on block 40 until the slide 39 is withdrawn, so as to release lever 37. Upon being released the lower end of said lever is passed into block 38 by means of a spring, 45, arranged under the upper end of the lever. The two projections or lips at the lower end of said lever now enter block 38 at the sides of the block or former 40, and force the staple from off the same, and bring it in front of the driver 46, which consists of a push-bar arranged in the casing 36. At this juncture the wire is fed through the casing across the face of block 40 by means of the feed mechanism, which will be presently described, whereby a length of wire suitable for the next staple will lie transversely within the casing. As the slide 39 is forced down by means of crank 53 and connecting devices, the staple formed will be driven through the meeting flaps of the tray, so as to hold them together, and at the same time a new staple will be made, so that at each revolution of the crank one staple is made and one driven. All of the movements of the staple making and driving devices are derived from said crank 53.

47 indicates a metal plate made to receive slide 43, which occupies a slot in the said plate. Said plate also receives the slide 39 and the driver 46, riveted thereto or otherwise secured, and said plate has a groove or slot, as aforesaid, for slide 43. A stop, 48, is located within the casing to check slide 43 at the proper moment, so as to prevent it from dropping down too far. The plungers 41 are hinged to the sides of plate 47, and are pressed slightly out from the sides of the same by springs 49, so as to be at angle to the sides of block 40 before they reach the same. When they descend and bend the wire on block 40, they will swing inwardly, thus compressing the wire fairly on the sides of block 40, which, it will be seen, are at slight angles to a line taken longitudinally through the block, whereby the sides of the staple will have the proper angle. The plungers 41 41 are hinged in place in the plate 47 by being dropped down into recesses or cut-away portions 70' in said plate 47, and have slight lateral play between the walls of the case 36 and the said plate 47. The plungers 41 41 are beveled at their lower ends, as shown, and it is the outer bevels on the plungers which, when they reach the bevels 71 71 of the block 38, cause the plungers to swing or move inward, as before mentioned.

50 designates a threaded socket in the lower end of the crank-arm 50', into which the threaded stem of an eyebolt, 51, connected to plate 47, screws, and 52 is a jam-nut by which the joint thus formed is adjusted to compensate for wear.

The shaft having the crank-bend 53 is provided with a bevel-gear, 54, driven by a bevel-gear, 55, upon the main shaft.

The devices for feeding the wire at the proper moments to the staple mechanisms are both of the same construction, a description for one serving for both.

56 indicates the two feed-rollers, which feed the wire forward to the staple mechanism. These rollers carry intermeshing gears, and are caused to move at stated periods by means of a knocker-arm, 57, secured upon the main driving-shaft, and adapted to strike against the arms 58 of a wheel, 59, fixed upon the axle of one of the feed-rollers. This wheel has as many arms as I propose making staples to one revolution of the feed-roller.

The operation may be briefly summed up as follows: A blank being placed upon guides 69, the former-wheel, locked upon its supporting-shaft, will rise until it reaches the staple mechanisms, at which point it will remain at rest for a sufficient length of time for the staple-drivers to drive the staples into the flaps of the blank, so as to form the complete box or tray. As the former-wheel descends, it is automatically unlocked and caused to turn sufficiently to allow the box or tray to drop off and to bring another former into position, the rotation of the former-wheel being positively checked at the required moment by the spring-bar engaging the ratchet-wheel hereinbefore described.

The staple making and driving mechanisms are so timed that while a staple is being driven a staple is being made, and the devices for impelling said mechanisms are timed so that the staples shall be projected from the casings of the staple mechanism at the moment the former arrives at the elevation requisite for driving the staples into the flaps or sides of the trays.

Having thus described our invention, what we claim is—

1. The combination, in a machine for making butter-trays, of the rotary former-wheel, with means, substantially as described, for raising said former-wheel up to the staple making and driving mechanism, lowering and giving a partial rotation to it, and locking it during its ascent, as and for the purpose described.

2. The combination, with the rotary former-wheel mounted upon a vertically-movable shaft, of the grooved eccentrics and connecting-bars for raising and lowering said shaft, substantially as described.

3. The combination, with the rotary former-wheel mounted upon a vertically-movable shaft, of the connecting-rod 21, the ratchet-wheel 25, loosely mounted on said shaft, and actuated by said connecting-rod as the shaft rises and falls, and the pawl engaging the ratchet-wheel, and carried by an arm upon a hub of the former-wheel, whereby as the former-wheel descends it will be partially rotated, substantially as and for the purpose described.

4. The combination, with the rotary former-wheel loosely mounted upon a vertically-moving shaft, of the ratchet-wheel 32, fixed upon the hub of the former-wheel, the spring locking-lever 29, rigidly connected with the shaft, and adapted to engage and lock the ratchet-wheel, and the slip-latch 33, for disengaging the locking-lever from the ratchet-wheel, substantially as described.

5. The combination, with the rotary former-wheel loosely mounted upon a vertically-movable shaft, of the ratchet-wheel 32, fixed upon the hub of the former-wheel, means, substantially as described, for imparting a partial rotation to the former-wheel as it descends, and the spring-bar located in position to engage the ratchet-wheel after the former-wheel has performed its required partial revolution, substantially as described.

6. The combination, with the rotary former-wheel loosely mounted upon a vertically-movable shaft, of the eccentrics 5, provided with a groove, 7, and mounted upon the main driving-shaft, and connections, substantially as described, between the grooved eccentric and the vertically-movable shaft, the groove of said eccentrics being provided with a concentric depression, 6, substantially as described.

7. The combination, with the former-wheel mounted upon a vertically-movable shaft, of mechanism, substantially as described, for making and driving staples into the sides of the tray placed upon the former-wheel, substantially in the manner described.

8. The combination, with the staple making and driving mechanism, of the rotary former-wheel provided with a series of formers, 19, and loosely mounted upon a vertically-movable shaft, and means, substantially as described, for automatically imparting a partial rotation to the former-wheel as it is lowered, substantially as and for the purpose specified.

9. The staple making and driving mechanism, comprising a block upon which the staple is formed, plungers 41, for cutting the wire and bending it upon the sides of the block, and a lever, 37, adapted to force the staple from the block and bring it into the path of the driver, substantially as described.

10. The combination, with the block upon which the staples are formed, of the plungers 41, for cutting and bending the wire into staple form, the slide 43, which acts to form the middle of the staple, the lever 37, for forcing the staple from the block, and the staple-driver 46, substantially as described.

11. The combination, with the block upon which the staples are formed, of the lever 37, adapted to force the staples from the block, and the slide 39, for engaging and releasing the upper end of the lever, substantially as described.

In testimony that we claim the above we have hereunto subscribed our names in the presence of two witnesses.

NORMAN E. BROWN.
WILLIAM R. WILLCOX.

Witnesses:
B. M. SPUNGSTEN,
G. GOODFELLOW.